United States Patent Office 3,447,904
Patented June 3, 1969

3,447,904
TEST INDICATOR FOR THE DETECTION OF CHLORIDES
Chauncey Orvis Rupe, Elkhart, Ind., assignor to Miles Laboratories, Inc., Elkhart, Ind., a corporation of Indiana
No Drawing. Filed Sept. 25, 1964, Ser. No. 399,328
Int. Cl. G01n *31/22, 33/16*
U.S. Cl. 23—230
18 Claims

ABSTRACT OF THE DISCLOSURE

Test indicator for the detection of chloride ions utilizing an insoluble or non-dissociable compound, such as silver carbonate, reactable with chloride to produce a potential chromogenic agent and an indicator material such as bromphenol blue reactable with the potential chromogenic agent to produce a color change. The above ingredients are preferably incorporated with a carrier material.

---

This invention relates to the detection of chlorides and to an improved composition and test device useful in the qualitative and quantitative determination of chlorides in biological fluids and other aqueous systems. In one of its more particular aspects, this invention is concerned with a chloride test reagent composition which can be incorporated upon a bibulous carrier to provide a convenient "dip and read" test.

Regulation of the concentration of salts in the tissue fluids of the body is important in connection with maintenance of normal ranges of osmotic pressure; the relation between the concentrations of sodium, potassium, calcium and other cations and acid-base equilibria. Chlorides are the most abundant salts found in the body fluids. In the blood, for example, chlorides are the chief contributors to the creation and maintenance of osmotic pressure. The concentration of chlorides in the blood under normal circumstances is remarkably constant. In the urine the concentration may vary enormously from individual to individual dependent, for example, upon diet.

The presence of chlorides in excess or the lack thereof, or variations in the chloride levels in body fluids are well recognized as extremely significant in the reflection of abnormal conditions in the body. Lack of chlorides in the urine is indicative of numerous abnormal conditions, for example, nephritis, sodium chloride deficiency syndrome, and intestinal obstructions. Variations in the chloride content of blood plasma may be indicative of alkalemia or acidemia, which conditions are symptomatic of various body abnormalities. In certain types of cardiac and renal disease it is necessary to closely control the salt (sodium chloride) intake. Checking the urine for chlorides is an effective method of monitoring the salt intake.

It may be readily appreciated that chloride detection in body fluids is extremely important to the healing arts. The unavailability of accurate, simple, rapid and economical tests for the determination of chloride in blood fluids greatly impedes careful diagnosis and monitoring of various abnormal body conditions.

Chloride detection is also of significance in many industrial applications.

Accordingly, the present invention provides an extremely reliable, rapid and simple test for the qualitative and quantitative determination of chlorides in fluids, particularly in body fluids such as blood or urine, which can advantageously be used by persons unskilled in laboratory techniques as well as by skilled laboratory technicians and physicians.

The prior art methods for the quantitation of chloride in urine and other biological fluids are not completely satisfactory for a variety of reasons. By way of example, the Volhard-Harvey test, which is commonly used in the detection of urinary chloride requires complex laboratory equipment and trained analysts for the accurate preparation and standardization of reagents as well as for carrying out the actual analysis. This test and variations thereof cannot be utilized satisfactorily unless performed in a well-equipped laboratory. A further disadvantage lies in the fact that various commonly ingested drugs, for example, aspirin, interfere with the test or render impossible the achievement of accurate test results.

The other urinary chloride tests commonly used are modifications of Mohr's reaction and like the Volhard-Harvey test are subject to disadvantages which definitely limit their usefulness in testing procedures. Among these disadvantages may be mentioned the following:

(1) Reagents are used as liquids and at least two separate liquid reagents must be used for a chloride determination.

(2) Solutions must be accurately prepared and standardized before use. This necessitates the use of an analytical balance for weighing and titrimetric equipment for reagent standardization.

(3) Liquid reagents evaporate on standing. This changes the composition of the mixture and results in incorrect estimations of urinary chloride content.

(4) Aqueous silver nitrate solutions used in these tests are unstable.

(5) Silver nitrate solutions form unsightly and difficultly removable stains when contacted with the skin, clothing and the like.

(6) With liquid reagents there is present the danger of spilling solutions.

(7) With the methods commonly used the same dropper is used throughout with the operator rinsing it after measuring urine and after measuring each reagent. If the dropper is not rinsed thoroughly each time, the reagents can become contaminated with urine thus causing further inaccuracies.

In accordance with this invention, a test composition, in the form of bibulous strips or sticks, is provided which enables accurate, rapid detection of the chloride contents of body fluids. The "dip and read" test compositions of this invention provide many advantages over prior known reagent methods and compositions from the standpoint of ease and simplicity of test procedure, ease of disposal of test devices, rapidity of test procedure, and of extreme importance, capability of being used by those not skilled in laboratory techniques.

It is therefore an object of this invention to provide improved diagnostic tests for the detection of chlorides in liquids which may be prepared in readily usable form.

It is an additional object of this invention to provide an improved chloride diagnostic device of the "dip and read" type.

Another object of this invention is to provide an improved chloride detection system incorporated on bibulous material whereby the user may rapidly and with ease determine the concentration of chloride ions in solution by an observable change in the detection system.

Another important object of this invention is the provision of an improved "dip and read" test device which is stable to moisture and prolonged exposure to variations in atmospheric conditions.

These and other objects and advantages will become readily apparent from a reading of the following detailed disclosure and description.

The chloride detection system of this invention utilizes the principle that with certain compounds chloride ions cause a release of other ions which can readily be detected. Such ions, upon reacting with an indicator, will produce an observable change such as a color change in the system. In order for this system to work, two conditions must prevail, as follows:

(1) There must be present an insoluble or non-dissociable component which, in the presence of chloride ions, will release a component which is capable of reacting with another substance to produce a color.

(2) Since the released component (ion) does not within itself produce a color then some substance must be present that will react with it to produce the color.

The reactions occurring in this invention can be represented generally as follows:

$$WX + Y^+Cl^- \rightarrow WCl + Y^+X^-$$
$$Y^+X^- + Z \rightarrow \text{color change}$$

wherein WX represents an insoluble or non-dissociable compound which is capable of reacting with a chloride salt, illustrated as $Y^+Cl^-$, to yield a compound or complex WCl and a potential chromogenic agent represented by the symbol $Y^+X^-$. This latter potential chromogenic agent is not itself colored but may in turn be made to react with another component (indicator) represented by Z to produce a color change which is readily observable to indicate the chloride ion content of $Y^+Cl^-$. Quantitation may be realized by means of a color chart which can be prepared to correlate the concentration of chloride ion with color gradations.

In the insoluble or non-dissociable component WX, W represents a metal selected from the group consisting of mercury and silver and X is selected from a group of anions which when reacted with the metal ions produce non-dissociable or insoluble compounds and when released are capable of effecting a color change when placed in the proper environment. The following anions possess these qualities: thiocyanate, ferrocyanide, ferricyanide, carbonate, phosphate, phthalate, gallate, etc. This list gives the type of anions that can be used without limiting the composition of the test to these ions.

The chloride ion is present as any soluble salt, represented by the symbol $Y^+Cl^-$ in which $Y^+$ may be, for example, $Na^+$, $K^+$, $NH_4^+$, etc.

Component Z in the system is an indicator which is sensitive to a change in the concentration of $X^-$. If X is a component which causes a change in pH then Z can be any one or combination of a number of acid-base indicators. If X is either gallate, ferrocyanide or thiocyanate then $Fe^{+++}$ becomes a good indicator. If X is ferricyanide then $Fe^{++}$ is a good indicator.

A number of chemical reactions involving either silver salts or mercuric salts may be used in formulating a chloride test. The choice of any particular silver or mercuric salt will depend upon the nature of the other components to be used within the formulation.

The chemical equations given below illustrate the types of chemical reactions involved in this invention. It is understood that the illustrations given do not limit the invention to these specific reactions, but are given to serve as illustrations of the reactions involved.

Silver citrate:

(1) $Ag_3C_6H_5O_7 + 3NaCl \rightarrow Na_3C_6H_5O_7 + 3AgCl\downarrow$ (2) $Na_3C_6H_5O_7 + \text{indicator} \rightarrow \text{color change}$ The sodium citrate formed in Reaction 1 causes an increase in pH hence a color change in the pH-sensitive indicator.

Silver carbonate:

(3) $Ag_2CO_3 + 2NaCl \rightarrow Na_2CO_3 + 2AgCl\downarrow$ (4) $Na_2CO_3 + \text{indicator} \rightarrow \text{color change}$ As in the case of silver citrate a rise in pH is effected which effects a color change in the indicator.

Silver metaphosphate:

(5) $AgPO_3 + NaCl \rightarrow NaPO_3 + AgCl\downarrow$ (6) $NaPO_3 + \text{indicator} \rightarrow \text{color change}$ Silver orthophosphate:

(7) $Ag_3PO_4 + 3NaCl \rightarrow Na_3PO_4 + 3AgCl\downarrow$ (8) $Na_3PO_4 + \text{indicator} \rightarrow \text{color change}$ Silver phthalate:

(9) $Ag_2C_8H_4O_4 + 2NaCl \rightarrow Na_2C_8H_4O_4 + 2AgCl\downarrow$

(10) $Na_2C_8H_4O_4 + \text{indicator} \rightarrow \text{color change}$

Mercuric carbonate:

(11) $HgCO_3 + 2NaCl \rightarrow Na_2CO_3 + HgCl_2$

(12) $Na_2CO_3 + \text{indicator} \rightarrow \text{color change}$

Mercuric orthophosphate:

(13) $Hg_3(PO_4)_2 + 6NaCl \rightarrow 2Na_3PO_4 + 3HgCl_2$

(14) $Na_3PO_4 + \text{indicator} \rightarrow \text{color change}$

Mercuric phthalate:

(15) $HgC_8H_4O_4 + 2NaCl \rightarrow Na_2C_8H_4O_4 + HgCl_2$

(16) $Na_2C_8H_4O_4 + \text{indicator} \rightarrow \text{color change}$

In each of the above reactions the chloride ions ($Cl^-$) present cause a change in pH. An indicator sensitive to pH change could be used to indicate the presence of chloride. Bromphenol blue, tetrabromphenol blue, bromthymol blue, thymol blue, phenol red, cresol red, bromcresol purple, phenolphthalein, tetrabromphenolphthalein, and phenoltetrabromphthalein disodium sulfonate are examples of indicators that can be used to indicate pH change.

In the following series of reactions the chloride ions present cause the release of a component which is capable of reacting with another substance (ferric ions=$Fe^{+++}$) to produce a color.

Silver thiocyanate:

(17) $AgCNS + NaCl \rightarrow NaCNS + AgCl\downarrow$

(18) $3NaCNS + Fe^{+++} \rightarrow Fe(CNS)_3 + 3Na^+$
(red color)

Silver ferrocyanide:

(19) $Ag_4Fe(CN)_6 + 4NaCl \rightarrow Na_4Fe(CN)_6 + 4AgCl\downarrow$

(20) $3Na_4Fe(CN)_6 + 4Fe^{+++}$
$\rightarrow Fe[FeFe(CN)_6]_3 + 12Na^+$
(blue color)

Silver gallate:

(21) $AgC_7H_5O_5 + NaCl \rightarrow NaC_7H_5O_5 + AgCl\downarrow$

(22) $3NaC_7H_5O_5 + Fe^{+++} \rightarrow Fe(C_7H_5O_5)_3 + 3Na^+$
(dark blue color)

Mercuric ferrocyanide:

(23) $Hg_2Fe(CN)_6 + 4NaCl \rightarrow Na_4Fe(CN)_6 + 2HgCl_2$

(24) $3Na_4Fe(CN)_6 + 4Fe^{+++}$
$\rightarrow Fe[FeFe(CN)_6]_3 + 12Na^+$
(blue color)

Mercuric thiocyanate:

(25) $Hg(CNS)_2 + 2NaCl \rightarrow 2NaCNS + HgCl_2$

(26) $3NaCNS + Fe^{+++} \rightarrow Fe(CNS)_3 + 3Na^+$
(red color)

Mercuric gallate:

(27) $Hg(C_7H_5O_5)_2 + 2NaCl \rightarrow 2NaC_7H_5O_5 + HgCl_2$

(28) $3NaC_7H_5O_5 + Fe^{+++} \rightarrow Fe(C_7H_5O_5)_3 + 3Na^+$
(dark blue color)

Ferric ions from a number of ferric salts such as ferric sulfate or ferric ammonium sulfate may act as the indicator in these reactions.

In the following series of reactions the chloride ions present cause the release of a component which reacts with ferrous ions ($Fe^{++}$) to produce a color.

Silver ferricyanide:

(29) $Ag_3Fe(CN)_6 + 3NaCl \rightarrow Na_3Fe(CN)_6 + 3AgCl\downarrow$

(30) $2Na_3Fe(CN)_6 + 3Fe^{++} \rightarrow Fe[FeFe(CN)_6]_2 + 6Na^+$
(blue color)

Mercuric ferricyanide:

(31) $Hg_3[Fe(CN)_6]_2 + 6NaCl \rightarrow 2Na_3Fe(CN)_6 + 3HgCl_2$

(32) $2Na_3Fe(CN)_6 + 3Fe^{++} \rightarrow Fe[FeFe(CN)_6]_2 + 6Na^+$
(blue color)

Ferrous ions from a number of ferrous salts such as ferrous sulfate or ferrous ammonium sulfate may act as the indicator in these reactions.

While the reactions indicated in the foregoing equations 1–32 are generally known in the chemical arts, that is, formation of silver or mercuric chloride by reacting chloride ions with an insoluble silver or mercuric salt, it has heretofore been unknown to utilize the "byproduct" of this reaction, that is, the non-precipitated reaction product to register or cause a visible change to quantitatively determine chlorides in a liquid. Because of this discovery, a novel diagnostic test can be provided for the qualitative and quantitative determination of chlorides in fluids, particularly body fluids. This unexpected discovery has also enabled the production of a stable test device which successfully overcomes the disadvantages of prior known tests for chlorides discussed hereinabove.

In a preferred embodiment the reagents utilized in the chloride test of this invention are applied to a bibulous carrier such as a tablet or a strip of cellulosic material, for example, paper. Especially preferred are strips of filter grade paper which can be used in the formulation of convenient "dip and read" test devices. The reagents can of course be used in any other convenient form as well.

The non-dissociable component may be furnished as such, for example, as a solid material or as a suspension in a suitable medium such as gum arabic.

An especially satisfactory method of preparation, however, provides the non-dissociable component by means of an in situ double decomposition reaction utilizing soluble salts containing the requisite ions. This method of preparation is especially convenient in the case of "dip and read" test strips which can be dipped successively into the various salt solutions.

The following examples illustrate the preparation of the preferred test devices of this invention. It is to be understood that diagnostic test devices of this invention can be prepared utilizing any one of the reaction systems discussed hereinbefore as well as many other reaction systems which will occur to those skilled in the art.

Example 1

Paper strips (Whatman No. 1) were dipped into a 0.01 M sodium carbonate solution and then dried in a hot air oven at 70° C. for 10 minutes.

The strips were then dipped into a 0.02 M silver nitrate solution and dried as above. The dried paper strips were a buff color.

The resulting paper strips were then dipped into a solution containing phenoltetrabromphthalein disodium sulfonate, 0.25% in acetate buffer, 0.01 M, pH 6 and dried as above.

The resulting brownish color paper strips when dipped into a sodium chloride solution containing 120 milliequivalents of sodium chloride per liter (120 meq./l.) turned a purple color.

Similar formulae were produced using sodium citrate, sodium phosphate and sodium phthalate in place of sodium carbonate.

The sodium salts in these formulations serve to furnish the anion to produce the insoluble silver salt and also to produce an effective buffering system.

The pH of the system and the indicator used may be varied according to choice.

Example 2

Paper strips (Whatman No. 1) were dipped into a 0.01 M sodium metaphosphate solution and then dried in a hot air oven at 70° C. for 10 minutes.

The dried paper strips were then dipped into a mixture of 100 ml. of 0.02 M silver nitrate and 2 ml. of 5% phenoltetrabromphthalein disodium sulfonate and dried as above.

The resulting slightly yellowish paper strips when dipped into a sodium chloride solution containing 120 meq./l. of sodium chloride turned a purple color.

Example 3

Paper strips (Whatman No. 1) were dipped into 0.05 M sodium ortho-phthalate, pH 5.2 and then dried in a hot air oven at 70° C. for 10 minutes.

A quantity of 34.3 g. of $Hg(NO_3)_2 \cdot \frac{1}{2}H_2O$ was dissolved in about 500 ml. of distilled water. Concentrated nitric acid was added slowly until the mercuric nitrate was just brought into solution. Enough distilled water was added to give a total volume of 1000 ml. The dried strips of filter paper were placed in the solution for 2–3 minutes, removed, the excess solution blotted off and the strips dried at 70° C. for 10 minutes.

The resulting paper strips were then dipped into a solution containing tetrabromphenol blue, 0.1% in 95% alcohol, and dried as above.

The resulting light-yellow colored paper strips when dipped into a solution containing chloride ions turned a blue color.

It was found that better chloride test strips could be made by adding gelatin to the solution to increase the viscosity and sodium lauryl sulfate to give instantaneous wetting when the strip is dipped into the solution being tested for chloride.

Example 4

A solution was formed by adding 34.3 g. of mercuric nitrate $Hg(NO_3)_2 \cdot H_2O$ to distilled water. Just enough $HNO_3$ was added to bring the $Hg(NO_3)_2$ into solution which was then diluted to 1 liter.

Paper strips (Whatman No. 1) were dipped into the solution and dried in an oven for 20 minutes.

A combined buffer-indicator solution with phthalic acid was prepared as follows. Phthalic acid, 16.4 g., and tetrabromphenolphthalein, 250 mg., were dissolved in 500 ml. of 95% ethanol. To this solution 100 ml. of 1% sodium lauryl sulfate and 100 ml. of 2% gelatin were added and mixed. This was followed by the addition of 200 ml. of distilled water. The pH was adjusted to 3.5 with saturated NaOH and the resultant solution was then diluted to 1 liter with distilled water.

The dried strips impregnated with $Hg(NO_3)_2$ were then dipped into the buffer-indicator solution and again dried. The paper was a light dull yellow in color.

Upon dipping this paper into a solution containing chloride ions the color turned from yellow to blue.

The results for various concentrations of NaCl were:

| Concentration: | Results |
| --- | --- |
| No NaCl | No color change. |
| 60 meq. NaCl/l | Slight darkening. |
| 150 meq. NaCl/l | Mottled dull blue. |
| 500 meq. NaCl/l | Bright blue. |

In this example the soluble mercuric nitrate was used to prepare the insoluble mercuric phthalate. It will be appreciated that other soluble salts of either mercury or silver may be used to prepare the insoluble metal salts on the bibulous paper. For example, salts of acetic acid have been found useful.

Examples 1–4 illustrate how silver and mercuric salts can be used in a formula to produce a test for chloride ions ($Cl^-$) by causing a change in pH. The test formulations are not limited to these examples. Other salts of silver and mercury may be substituted (see illustrations). Furthermore by varying of pH of the formula different acid-base indicators can be used and strips of varying sensitivity can be made.

Utilizing the technique and methods of Example 4, bibulous strip diagnostics were prepared containing silver carbonate, silver citrate, silver metaphosphate, silver orthophosphate, silver phthalate, mercuric carbonate and mercuric orthophosphate. The silver salts were formed on the bibulous material by means of silver nitrate and the appropriate acid or salt. The results upon testing with various concentrations of NaCl were comparable to the results of Example 4.

Example 5

Paper strips (Whatman No. 1) were dipped into 0.1 M sodium thiocyanate, NaCNS and then dried in a hot air oven at 70° C. for 10 minutes.

The dried paper strips were then dipped into 0.2 M silver nitrate, $AgNO_3$, for 2–3 minutes, removed and washed in distilled water to remove the excess silver nitrate. The strips were dried as above and then dipped into a solution made by dissolving 2 g. $Fe_2(SO_4)_3 \cdot 9H_2O$, ferric sulfate, in 100 ml. of distilled water.

The strips were then dried at 70° C. for 10 minutes.

The slightly buff-colored strips turned reddish-brown when dipped into a solution containing chloride ions $(Cl^-)$.

Example 6

Paper strips (Whatman No. 1) were dipped into 0.02 M potassium ferrocyanide, $K_4Fe(CN)_6$ and then dried in a hot air oven at 70° C. for 10 minutes.

The dried paper strips were then dipped into 0.1 M silver nitrate, removed, blotted free of excess silver nitrate solution and dried as above.

The resulting paper strips were then dipped into a solution containing 2 g. of ferric sulfate, $Fe_2(SO_4)_3 \cdot 9H_2O$ in 100 ml. distilled water and dried in a hot air oven at 70° C. for 10 minutes.

The strips when dipped into a solution containing chloride ions changed from a yellow to blue.

Example 7

A quantity of 12.7 g. of potassium ferrocyanide, $$K_4Fe(CN)_6$$

was dissolved in distilled water and diluted to 1 liter. Paper strips (Whatman No. 1) were dipped into the solution and dried at 70° C.

To a separate mixture of 34.3 g. of mercuric nitrate in distilled water was added enough nitric acid, $HNO_3$, to hold the mercuric nitrate in solution. The previously treated strips were dipped into this solution and then dried at 70° C.

A third solution was formed from 96.4 g. of ferric ammonium sulfate, $FeNH_4(SO_4)_2$, dissolved in 1 liter of cyclohexylsulfonic acid (71.6 g./l.). The above strips were dipped into this solution and dried. The finished strips were light yellow in color. In the presence of chloride the strips turned from yellow to blue.

In the above example, the concentration of the reactants may be varied over a wide range, such as $$K_4Fe(CN)_6: 0.01-0.1 \text{ M}$$

$Hg(NO_3)_2$: 0.01–0.2 M, $FeNH_4(SO_4)_2$: 0.01–0.1 M. The acid is added to buffer the solution.

Example 8

Paper strips (Whatman No. 1) were dipped into 0.02 M potassium thiocyanate, KCNS, and then dried in a hot air oven at 70° C. for 10 minutes.

The dried paper strips were then dipped into 0.1 M mercuric acetate $Hg(C_2H_3O_2)_2$, prepared by dissolving 3.2 g. of $Hg(C_2H_3O_2)_2$ in 0.1 M acetic acid and diluting to 1000 ml. 0.1 M acetic acid, for 2–3 minutes, removed, blotted and dried as above.

The resulting paper strips were then dipped into a 2% ferric sulfate solution and dried as above.

The light buff strips when dipped into a solution containing chloride ions $(Cl^-)$ produced a reddish-brown color.

Utilizing the methods set out in Examples 5–8, diagonostic strips were also prepared utilizing, silver gallate and mercuric gallate and a ferric salt and silver ferricyanide and mercuric ferricyanide and a ferrous salt.

Example 9

A mixture of 100 ml. of 20% gum arabic solution was thoroughly mixed with 140 ml. of 1 M mercuric acetate prepared by adding 96 g. of mercuric acetate and 120 g. of maleic acid to hot distilled water (80–90° C.) and diluting to 300 ml. To the resulting mixture was then added 80 ml. of 0.2 M potassium ferrocyanide with rapid mixing. Then a 5% solution of ferric sulfate was added and the resulting solution mixed thoroughly. The suspension was then poured into a shallow dish.

Paper strips (Whatman No. 1) were dipped into the suspension, removed, passed through a clothes wringer to remove excess solution and dried in a hot air oven at 100° C.

The orange colored impregnated paper strips turn blue when dipped into a solution containing chloride ions.

In contrast to the in situ formed precipitates of Examples 1–8 the diagnostic test indicator of Example 9 utilizes a suspension of the non-dissociable compound in gum arabic. Other suspending agents can be course be used if desired.

In order to facilitate reading the results obtained by the use of the diagnostic test indicators of this invention color standard charts are prepared, dependent upon the particular reaction system utilized. Utilizing the standardized charts, the person performing the test merely compares the color developed on the diagnostic strip with the chart.

The bibulous material utilized in this invention may be any such material known in the art, for example, paper, porous wood, cotton, wool, synthetic fibers, or the like, so long as it is capable of holding the color responsive substance and rapidly absorbing, or otherwise picking up a substantially constant amount of the liquid being analyzed upon momentary immersion therein. The bibulous material should, of course, be free from chloride ions. Because of its relatively low cost and desirable absorptive characteristics paper is ideally suited for use in the invention.

The method of this invention may be carried out either by immersing the diagnostic strip in the liquid to be tested or by applying a drop of the liquid to the strip and observing the color change of the ring formed around the drop.

It is obvious that certain changes and modifications may be made in the above compositions and methods without departing from the spirit and scope of the invention and it is intended that all matter contained in the foregoing description shall be interpreted as illustrative and not in a limiting sense. It is also understood that such other modifications may be made without departing from the spirit and scope of the appended claims.

What is claimed is:

1. A test indicator for detecting chloride ions in solutions comprising a bibulous material having applied thereto a first component WX and a second component Z, wherein WX is a non-dissociable compound in which W is a metal selected from the group consisting of mercury and silver and which compound will release a potential chromogenic agent in the presence of chloride ions, and Z is an indicator responsive to said potential chromogenic agent.

2. A test indicator for detecting chloride ions in solutions comprising a bibulous material having applied thereto a first component WX and a second component Z, wherein W is a metal selected from the group consisting of mercury and silver and (1) when X is an anion of a weak acid Z is an indicator responsive to a change in pH; (2) when X is ferricyanide Z is a salt which yields ferrous ions in solution; and (3) when X is a member selected from the group consisting of thiocyanate ferrocyanide and gallate Z is a salt which yields ferric ions in solution.

3. A test indicator as set forth in claim 2 wherein WX is a compound selected from the group consisting of silver carbonate, silver citrate, silver metaphosphate, silver orthophosphate, silver phthalate, mercuric carbonate, mercuric orthophosphate and mercuric phthalate, and Z is an indicator responsive to a change in pH.

4. A test indicator as set forth in claim 2 wherein Z is selected from the group consisting of bromphenol blue, tetrabromphenol blue, bromthymol blue, thymol blue, phenol red, cresol red, bromcresol purple, phenolphthalein, tetrabromphenolphthalein, and phenoltetrabromphthalein disodium sulfonate.

5. A test indicator as set forth in claim 2 wherein WX is a compound selected from the group consisting of silver ferricyanide and mercuric ferricyanide and Z is a soluble ferrous salt.

6. A test indicator as set forth in claim 2 wherein WX is a member selected from the group consisting of silver thiocyanate, silver ferrocyanide, silver gallate, mercuric thiocyanate, mercuric ferrocyanide and mercuric gallate, and Z is a soluble ferric salt.

7. A test indicator as set forth in claim 2 wherein WX is present as a suspension in gum arabic.

8. A test indicator as set forth in claim 2 wherein WX is an in situ formed precipitate.

9. A method for rapidly testing a solution for the presence of chloride ions, which comprises contacting said solution with a bibulous test indicator having applied thereto a non-dissociable first component WX and a second component Z, wherein W is a metal selected from the group consisting of mercury and silver and, (1) when X is an anion of a weak acid Z is an indicator responsive to a change in pH; (2) when X is ferricyanide Z is a salt which yields ferrous ions in solution; and (3) when X is a member selected from the group consisting of thiocyanate, ferrocyanide and gallate Z is a salt which yields ferric ions in solution, whereby the reaction of WX with any chloride ions present releases X which acts upon Z to produce a visible change in the bibulous strip.

10. A method as set forth in claim 9 wherein WX is a momber selected from the group consisting of silver carbonate, silver citrate, silver metaphosphate, silver orthophosphate, silver phthalate, mercuric carbonate, mercuric orthophosphate and mercuric phthalate, and Z is an indicator responsive to a change in pH.

11. A method as set forth in claim 9 wherein WX is a member selected from the group consisting of silver ferricyanide and mercuric ferricyanide and Z is a soluble ferrous salt.

12. A method as set forth in claim 9 wherein WX is a member selected from the group consisting of silver thiocyanate, silver ferrocyanide, silver gallate, mercuric thiocyanate, mercuric ferrocyanide and mercuric gallate, and Z is a soluble ferric salt.

13. a method for rapidly quantatively testing a solution for the presence of chloride ions, which comprises (A) contacting said solution with a bibulous test indicator having applied thereto a first component WX and a second component Z, wherein W is a metal selected from the group consisting of mercury and silver and (1) when X is an anion of a weak acid Z is an indicator responsive to a change in pH; (2) when X is a ferricyanide Z is a salt which yields ferrous ions in solution; and (3) when X is a member selected from the group consisting of thiocyanate, ferrocyanide and gallate Z is a salt which yields ferric ions in solution, wherein the reaction of WX with any chloride ions present releases X which acts upon Z to produce a visible change in the bibulous strip; and (B) comparing the resultant color change to a standardized color chart for the system employed to quantitatively determine the concentration of chloride ions in the test solution.

14. The method of preparing a test indicator for detecting chloride ions in solutions which comprises impregnating a bibulous strip with (1) a solution of a soluble salt of a metal selected from the group consisting of mercury and silver, and (2) a member selected from the group consisting of (a) a mixture of an acid which forms an insoluble salt with said metal and an indicator responsive to a change in pH, (b) a soluble salt of a ferricyanide followed by a soluble ferrous salt, and (c) a soluble salt selected from the group consisting of thiocyanates, ferrocyanides and gallates, and (3) a soluble ferric salt.

15. The method of claim 14 wherein said metal is silver and said acid is selected from the group consisting of carbonic, citric, metaphosphoric, orthophosphoric, and phthalic acids.

16. The method of claim 14 wherein said metal is mercury and said acid is selected from the group consisting of carbonic, orthophosphoric and phthalic acids.

17. The method of claim 14 wherein said indicator is selected from the group consisting of bromphenol blue, tetrabromphenol blue, bromthymol blue, thymol blue, phenol red, cresol red, bromcresol purple, phenolphthalein, tetrabromphenolphthalein, and phenoltetrabromphthalein disodium sulfonate.

18. The method of claim 14 wherein the strips are dried after each solution is applied.

References Cited
UNITED STATES PATENTS 2,676,874 4/1954 Devine _____ 23—253
3,095,382 6/1963 Hach _____ 252—408
3,185,549 5/1965 Hamilton _____ 23—230

JOSEPH SCOVRONEK, Primary Examiner.

U.S. Cl. X.R.

23—253; 252—408